(12) United States Patent
Isayama (10) Patent No.: US 7,887,075 B2
(45) Date of Patent: Feb. 15, 2011

(54) MOTORCYCLE

(75) Inventor: Hiroyuki Isayama, Samutprakarn (TH)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 769 days.

(21) Appl. No.: 11/459,590

(22) Filed: Jul. 24, 2006

(65) Prior Publication Data

US 2007/0024018 A1 Feb. 1, 2007

(30) Foreign Application Priority Data

Jul. 25, 2005 (JP) ............................ 2005-213968

(51) Int. Cl.
*B62J 15/02* (2006.01)
(52) U.S. Cl. .................. 280/152.1; 280/154; 180/219
(58) Field of Classification Search ............... 180/218, 180/219; 280/847, 152.1, 152.3, 848, 154, 280/851, 852, 159, 160; 296/198; 293/12, 293/13
See application file for complete search history.

(56) References Cited

U.S. PATENT DOCUMENTS

| | | | | |
|---|---|---|---|---|
| 4,458,909 A | * | 7/1984 | Morioka | ..................... 280/279 |
| 5,489,108 A | * | 2/1996 | Slade | ....................... 280/152.3 |
| 6,634,664 B1 | * | 10/2003 | Kojima | ..................... 280/288.4 |
| 6,676,149 B2 | * | 1/2004 | Kamemizu et al. | ........ 280/281.1 |
| 7,090,235 B2 | * | 8/2006 | Takemura et al. | ......... 280/152.2 |
| 7,094,267 B2 | * | 8/2006 | Inayama | ..................... 55/385.3 |
| 7,111,701 B2 | * | 9/2006 | Nagashii et al. | .............. 180/219 |

FOREIGN PATENT DOCUMENTS

| | | | |
|---|---|---|---|
| DE | 38 31 793 A1 | * | 3/1990 |
| JP | 62-153709 U | | 9/1987 |
| JP | 2517216 | | 4/1996 |

* cited by examiner

*Primary Examiner*—Frank B Vanaman
(74) *Attorney, Agent, or Firm*—Keating & Bennett, LLP (57) ABSTRACT

A motorcycle that prevents attachment of splashed water to the entire periphery of the front fork. A front fender is separated into a front fender half and a rear fender half. The front fender half has left and right sidewalls (rear end portions), and the rear fender half has left and right sidewalls (front end portions). The front and rear fender half sidewalls enclose the outer periphery of left and right fork bodies. The sidewalls have extended portions extending downward along the left and right fork bodies and lower rear end faces that extend generally linearly from the lower front ends of the extended portions to the upper rear ends thereof obliquely upward.

20 Claims, 8 Drawing Sheets

MOTORCYCLE

RELATED APPLICATIONS

This application claims the benefit of priority under 35 USC 119 of Japanese patent application no. 2005-213968, filed on Jul. 25, 2005, which application is hereby incorporated by reference in its entirety.

BACKGROUND OF THE INVENTION

1. Field of the Invention

The present invention relates to a motorcycle having a front fender to cover the upper side of a front wheel rotatably supported with a front fork.

2. Description of Related Art

Some motorcycles have a front fender separated into a front and a rear fender half for improvement in the ability to replace and attach parts and for easy manufacturing. In JP-B-2517216, for example, the rear ends of a front fender half and the front ends of a rear fender half are overlapped with each other, and the overlapping parts are fastened to the outside walls of left and right fork bodies of the front fork.

This conventional front fender configuration is problematic in that water or the like splashed by the front wheel attaches to the inside walls of the fork bodies.

SUMMARY OF THE INVENTION

In view of the foregoing problem, it is an object of the present invention to provide a motorcycle that prevents attachment of splashed water to the front fork on the entire periphery of the fork bodies.

The present invention is directed to a motorcycle comprising a body frame. A front fork is pivotally supported with a head pipe of the body frame. A front wheel is rotatably supported at the lower ends of left and right fork bodies of the front fork. A front fender is disposed to cover an upper side of the front wheel, and is separated into a front fender half and a rear fender half. The front fender half has rear end portions and the rear fender half has front end portions. The rear end portions and the front end portions enclose the outer periphery of the left and right fork bodies. The rear end portions have extended portions extending downward along the left and right fork bodies, and lower rear end faces formed to extend generally linearly and obliquely upward from lower front ends and upper rear ends of the extended portions.

According to the invention, the rear end portions of the front fender half and the front end portions of the rear fender half enclose the entire outer periphery of the left and right fork bodies, preventing attachment of water splashed by the front wheel along the entire peripheral faces including the inside faces of the fork bodies.

According to the invention, the rear end portions of the front fender half have extended portions extending downward, and lower rear end faces formed to extend linearly from the lower front ends of the extended portions to the upper rear ends thereof obliquely upward. It is thus possible to prevent attachment of splashed water to the fork bodies by the extended portions further reliably. Further, the lower faces of the rear end portions of the front fender half slant sharply obliquely upward, providing a new design not seen before.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the present invention is described hereinafter with reference to the attached drawings.

FIGS. 1-8 are explanatory views of a motorcycle in accordance with an embodiment of the present invention. Additionally, in the following description and claims the terms "right," "left," "front" and "rear" mean right, left, front and rear sides from the perspective of a rider seated in the seat.

In the drawings, reference numeral 1 denotes a motorcycle. The motorcycle 1 includes an underbone type body frame 2; a head pipe 3 fixed to the front end of the body frame 2; a front fork 4 pivotally supported with the head pipe 3 for left-and-right pivotal movement; an engine unit 5 suspended from and supported by the central portion of the body frame 2; a rear arm 6 pivotally supported therewith for up-and-down pivotal movement; and a seat 7 for two persons mounted on the upper rear portion of the body frame 2.

A front wheel 8 is rotatably supported at the lower end of the front fork 4. Steering handlebars 9 are fixed at the upper end of the front fork 4. A rear wheel 10 is rotatably supported at the rear end of the rear arm 6.

The body frame 2 includes a main frame 14 extending generally linearly from the head pipe 3 obliquely downward and towards the rear of the motorcycle (rearward); a pair of left and right seat rails 15, 15 connected to a middle part of the main frame 14 and extending linearly obliquely upward and rearward; and a pair of left and right backstays 16, 16 extending between and connected to longitudinally generally central parts of the left and right seat rails 15, 15 and the rear end of the main frame 14.

The engine unit 5 is mounted with the axis of its cylinder extending generally horizontally. An upper part of a crankcase 5a is suspended from and supported with an engine bracket 14a that is connected to a longitudinally generally central part of the main frame 14, and the rear end is suspended from and supported by a rear arm bracket 14b.

A crankshaft (not shown) disposed transversely of the vehicle is housed in the crankcase 5a. The engine unit 5 has a cylinder block 5b and a cylinder head 5c coupled to the front wall of the crankcase 5a, and a head cover 5d attached to the cylinder head 5c.

The top face of the cylinder head 5c is connected to an intake pipe 35 in communication with an inlet port 5e. The intake pipe 35 is connected to an air cleaner 37 via a carburetor 36. The air cleaner 37 is disposed above the engine unit 5, and supported with the main frame 14.

The front side of the head pipe 3 of the body frame 2 is covered with a front cover 11, and the rear side with a leg shield 12. A portion of the body frame 2 below the periphery of the seat 7 is covered with a side cover 13. The periphery of the steering handlebars 9 is covered with a handlebar cover 21, from which operating parts such as left and right grips 9a, 9a are exposed outside.

The front cover 11 includes a front cover portion 11a for covering the front side of the head pipe 3, and left and right cover portions 11b, 11b extending from the front cover portion 11a obliquely downward and rearward for covering the left and right sides of the cylinder head 5c and the head cover 5d.

The leg shield 12 includes a rear cover portion 12a for covering the rear side of the head pipe 3, and a tunnel-like shield portion 12b extending from the rear cover portion 12a obliquely downward and rearward so as to cover the upper side of the main frame 14. The shield portion 12b and the left and right cover portions 11b define an opening 38 for introduction of a traveling wind into the air cleaner 37 to the engine unit 5 (see FIG. 4).

Figure 5:
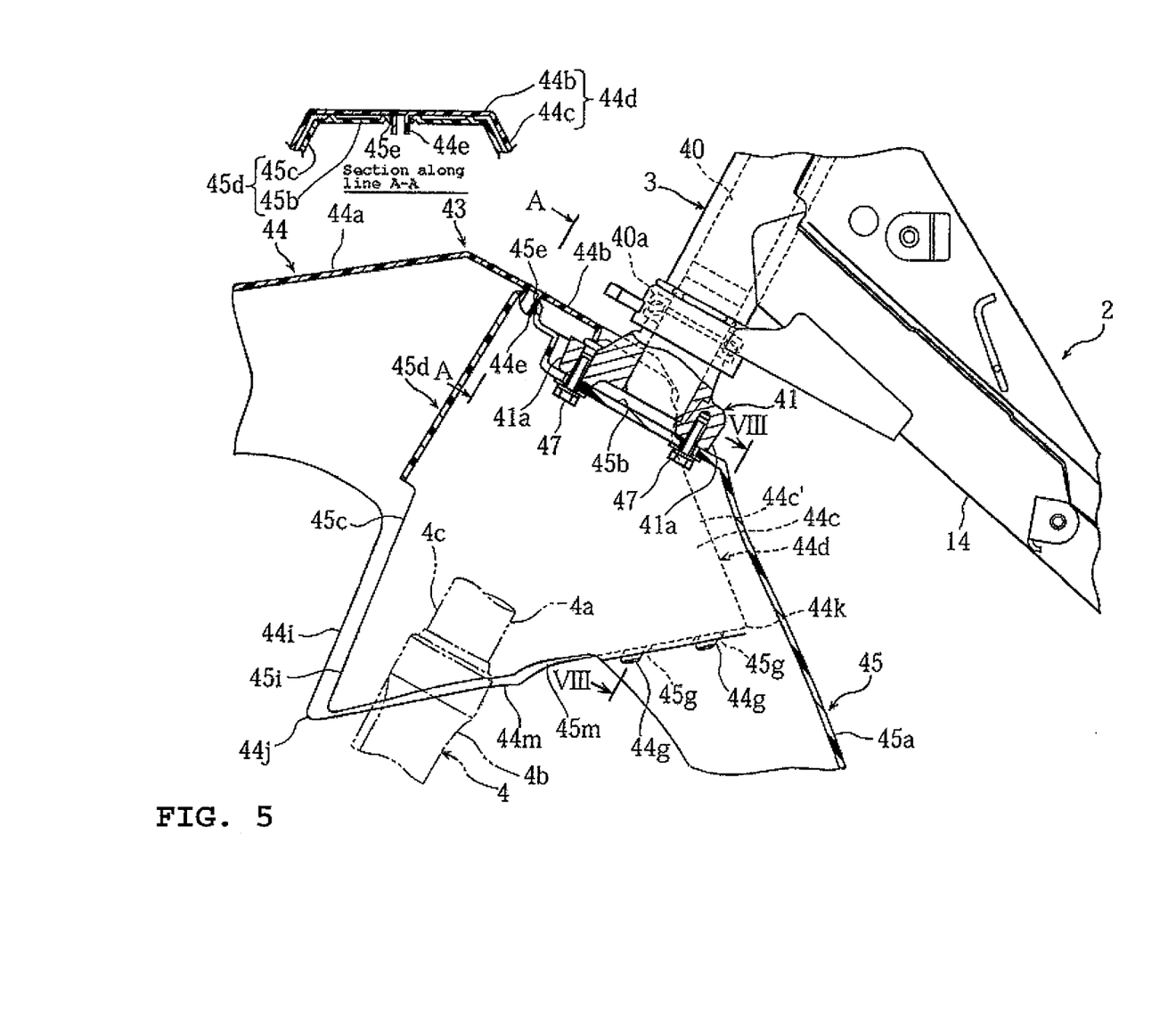
FIG. 5 is a sectional side view of the front fender.

The front fork 4 includes left and right fork bodies 42a, 42b; a steering bracket 41 having the left and right ends fixed to the upper ends of the left and right fork bodies 42a, 42b; and a steering shaft 40 fixed to the transverse central portion of the steering bracket 41. The steering shaft 40 is rotatably supported with the head pipe 3 via a bearing 40a (FIG. 5). The steering handlebars 9 are fixed to the upper end of the steering shaft 40.

The left and right fork bodies 42a, 42b are disposed to be inclined rearward, and is of a telescopic type having inner tubes 4a and outer tubes 4b disposed below the inner tubes to receive them for sliding movement. The upper ends of the left and right inner tubes 4a, 4a are fixed to the steering bracket 41. An axle 5a of the front wheel 8 is inserted through and fixed to the lower ends of the left and right outer tubes 4b, 4b.

The front fork 4 is provided with a front fender 43 for covering the upper side of the front wheel 8. The front fender 43 is made of resin material, and has a two-piece structure made up of a front fender half 44 for covering the upper side of the front wheel 8 and a rear fender half 45 for the rear side.

The front fender half 44 includes a front fender portion 44a of a generally beak shape, as viewed in a side view, for covering the upper side of the front wheel 8, and a rear attachment portion 44d having an upper wall 44b and left and right sidewalls (rear end portions) 44c, 44c formed at the rear end of the front fender portion 44a (FIG. 5).

The rear fender half 45 includes a rear fender portion 45a for covering the upper rear portion of the front wheel 8, and a front attachment portion 45d having an upper wall 45b and left and right sidewalls (front end portions) 45c, 45c formed at the front end of the rear fender portion 45a. The periphery of these front and rear upper walls 44b, 45b is covered with the front cover 11 and hidden inside it so as not to be seen from outside.

The upper wall 44b of the front fender half 44 is disposed above the steering bracket 41 to surround the front side of the steering shaft 40, and the upper wall 45b of the rear fender half 45 below the steering bracket 41 to surround the rear side of the steering shaft 40.

The upper walls 44b and 45b vertically overlap each other at their front parts. The left and right sidewalls 44c of the front fender half 44 are in turn disposed outside of the left and right sidewalls 45c of the rear fender half 45 in transversely overlapping relation.

The transverse central portion of the upper wall 44b of the front fender half 44 has a positioning projection 44e. The lower ends of the left and right sidewalls 44c of the front fender half 44 have a pair of front and rear engaging lugs 44g, 44g formed to be bent inward and project downward.

A part of the upper wall 45b of the rear fender half 45 that faces the positioning projection 44e has a hole 45e. A part of the left and right sidewalls 45c of the rear fender half 45 that faces the engaging lugs 44g has a step 45f having engaged holes 45g. The front fender half 44 is positioned to be immobile in the longitudinal, lateral or downward direction relative to the rear fender half 45, such that the positioning projection 44e of the front fender half 44 is fitted in the hole 45e of the rear fender half 45, and the left and right engaging lugs 44g in the engaged holes 45g of the rear fender half 45 (see FIGS. 5 and 8).

The upper wall 44b of the front fender half 44 has a pair of left and right recesses 44f, 44f to contact the upper wall 45b of the rear fender half 45. The left and right recesses 44f have screws 46 inserted therethrough to join the upper walls 44b and 45b (see FIG. 7).

Figure 4:
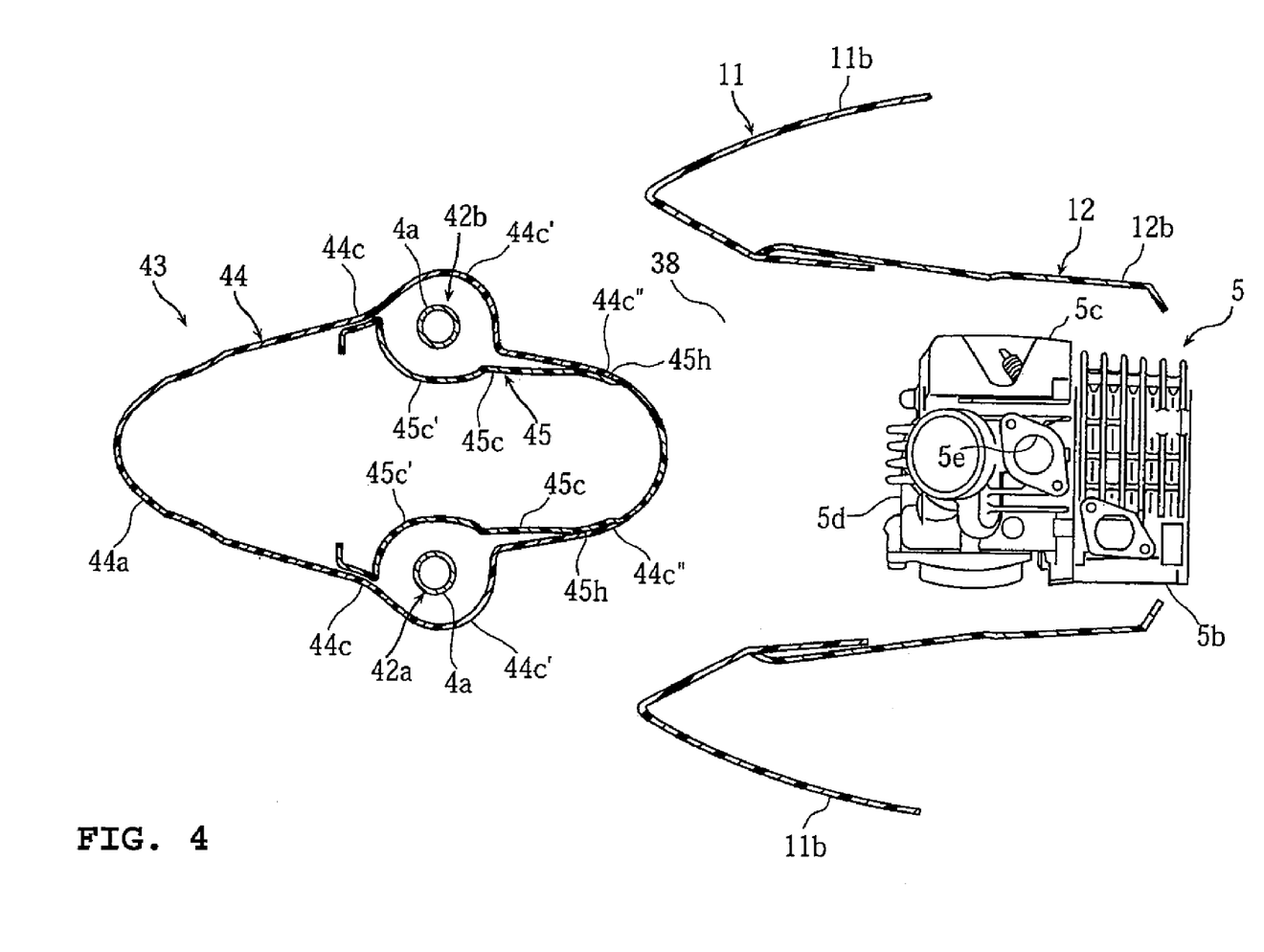
FIG. 4 is a cross-sectional view of the front fender along line IV-IV in FIG. 2.
Figure 8:
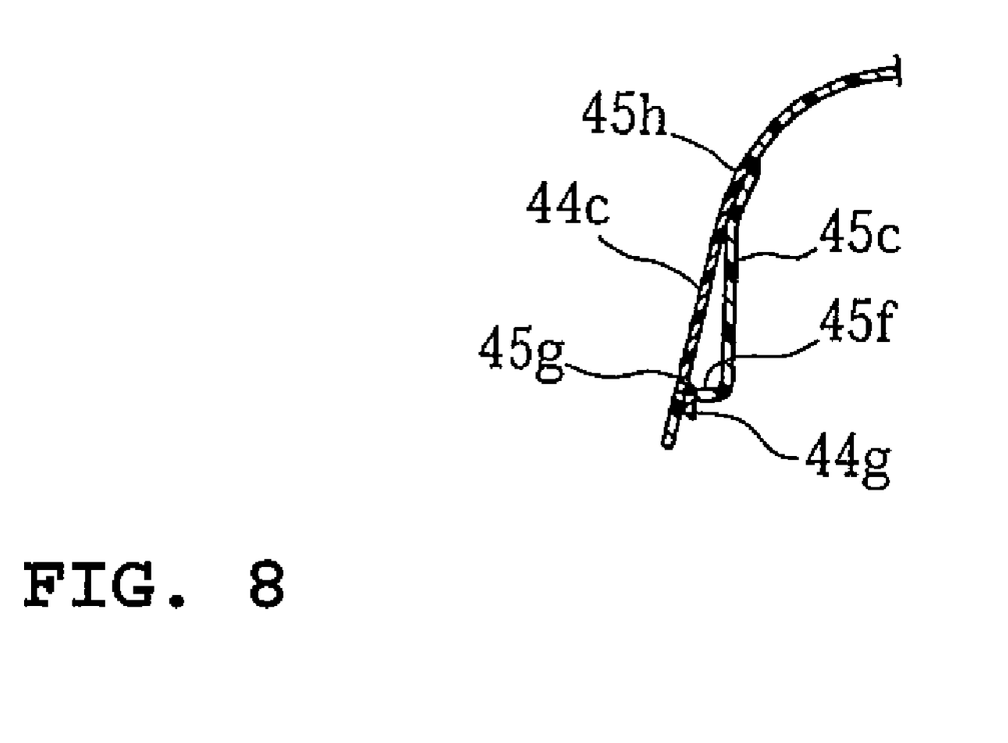
FIG. 8 is a sectional view of an attachment part of the front and rear fender halves along line VIII-VIII in FIG. 5.

The left and right sidewalls 45c of the rear fender half 45 have a recess 45h to form the shape of a continuous surface with the rear edges 44c'' of the left and right sidewalls 44c of the front fender half 44 (see FIGS. 4 and 8). The front and rear fender halves 44, 45 thus give the appearance of one body.

A central part of the front wall of the steering bracket 41, and the left and right side parts of the rear wall have projecting boss parts 41a. The boss parts 41a are secured to the upper wall 45b of the rear fender half 45 with bolts 47 fitted from underneath (see FIGS. 5 and 6).

Figure 6:
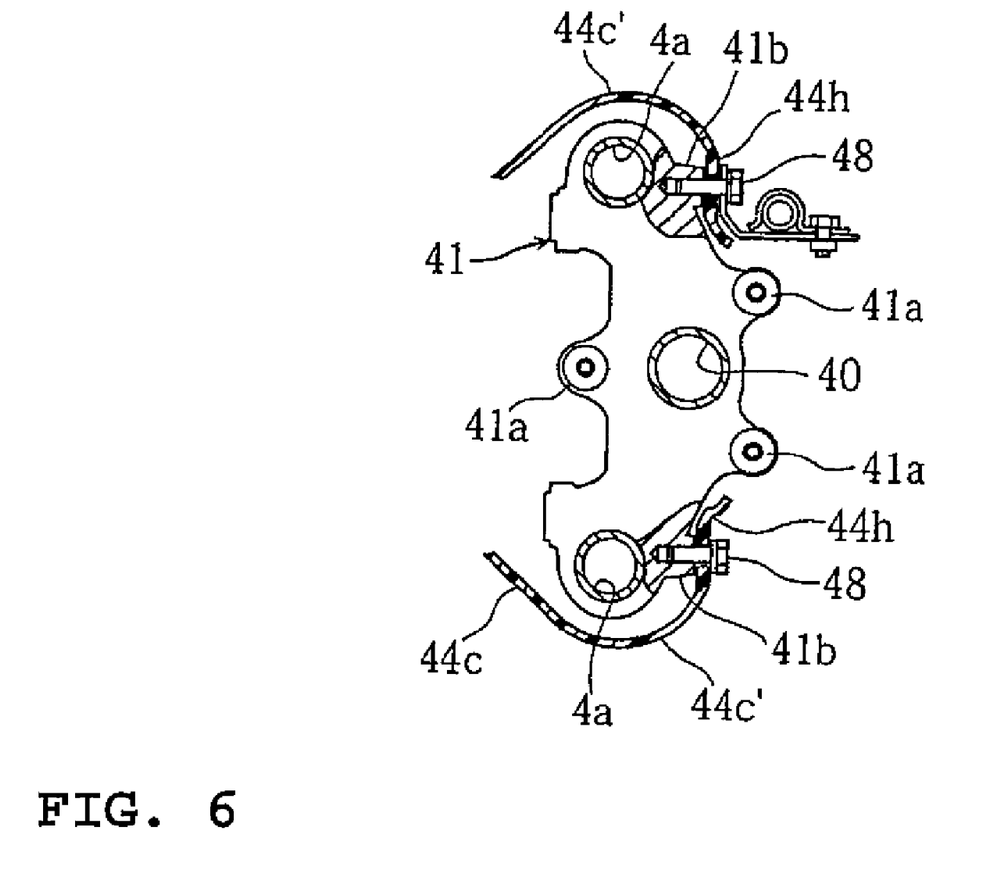
FIG. 6 is a sectional plan view of an attachment part of a front fender half along line VI-VI in FIG. 2.
Figure 7:
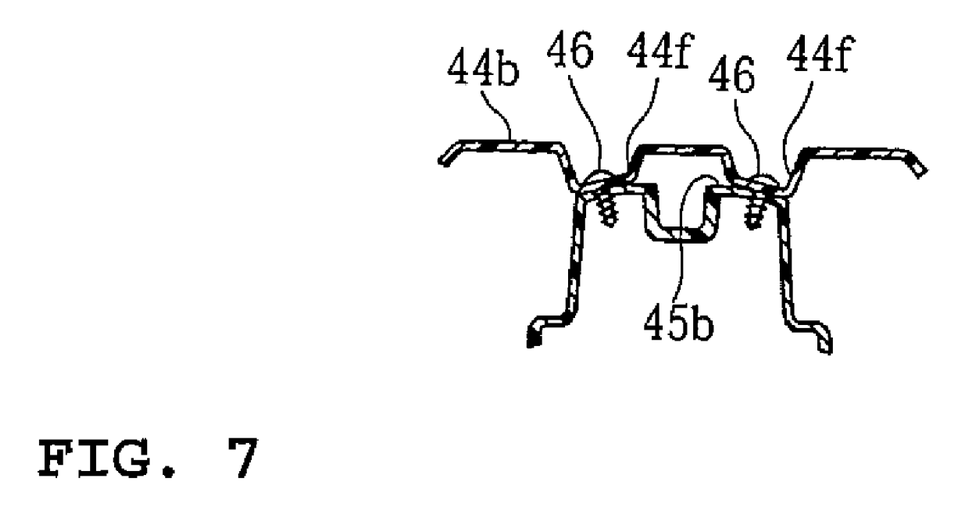
FIG. 7 is a sectional view of an attachment part of the front and a rear fender half along line VII-VII in FIG. 2.

The left and right side ends of the rear wall of the steering bracket 41 have boss parts 41b. The left and right boss parts 41b are secured to securing parts 44h formed in the left and right sidewalls 44c of the front fender half 44, with bolts 48 fitted from the rear (FIG. 6).

The left and right sidewalls 44c of the front fender half 44 have outwardly protruded parts 44c' formed to protrude outward transversely of the vehicle to surround the outside of the left and right fork bodies 42a, 42b. The left and right sidewalls 45c of the rear fender half 45 have inwardly protruded parts 45c' formed to protrude inward transversely of the vehicle to surround the inside of the left and right fork bodies 42a, 42b. The outwardly and inwardly protruded parts 44c', 45c' enclose the outer periphery of the inner tubes 4a of the fork bodies 42a, 42b (FIG. 4).

Figure 1:
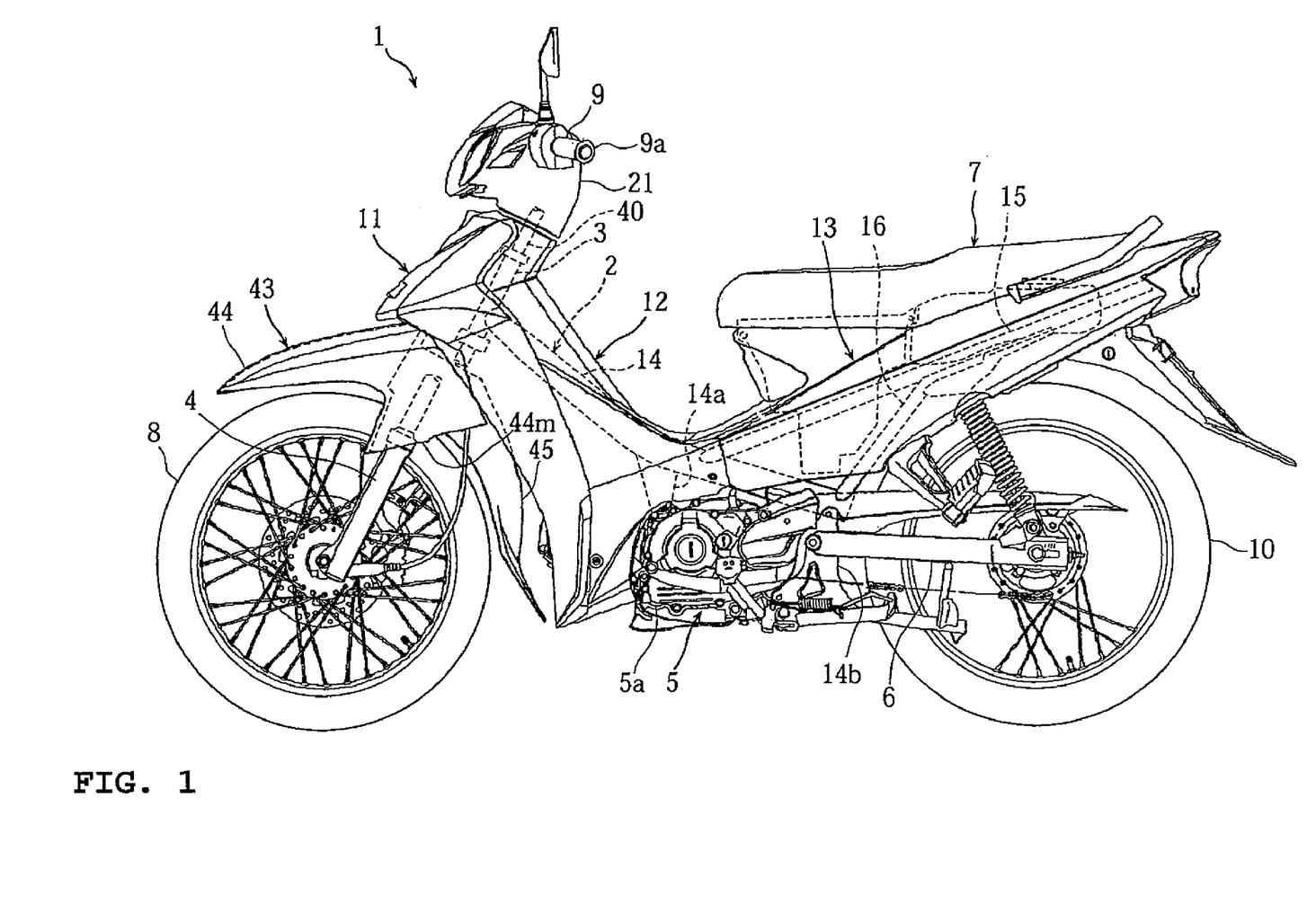
FIG. 1 is a side view of a motorcycle according to an embodiment of the present invention.
Figure 2:
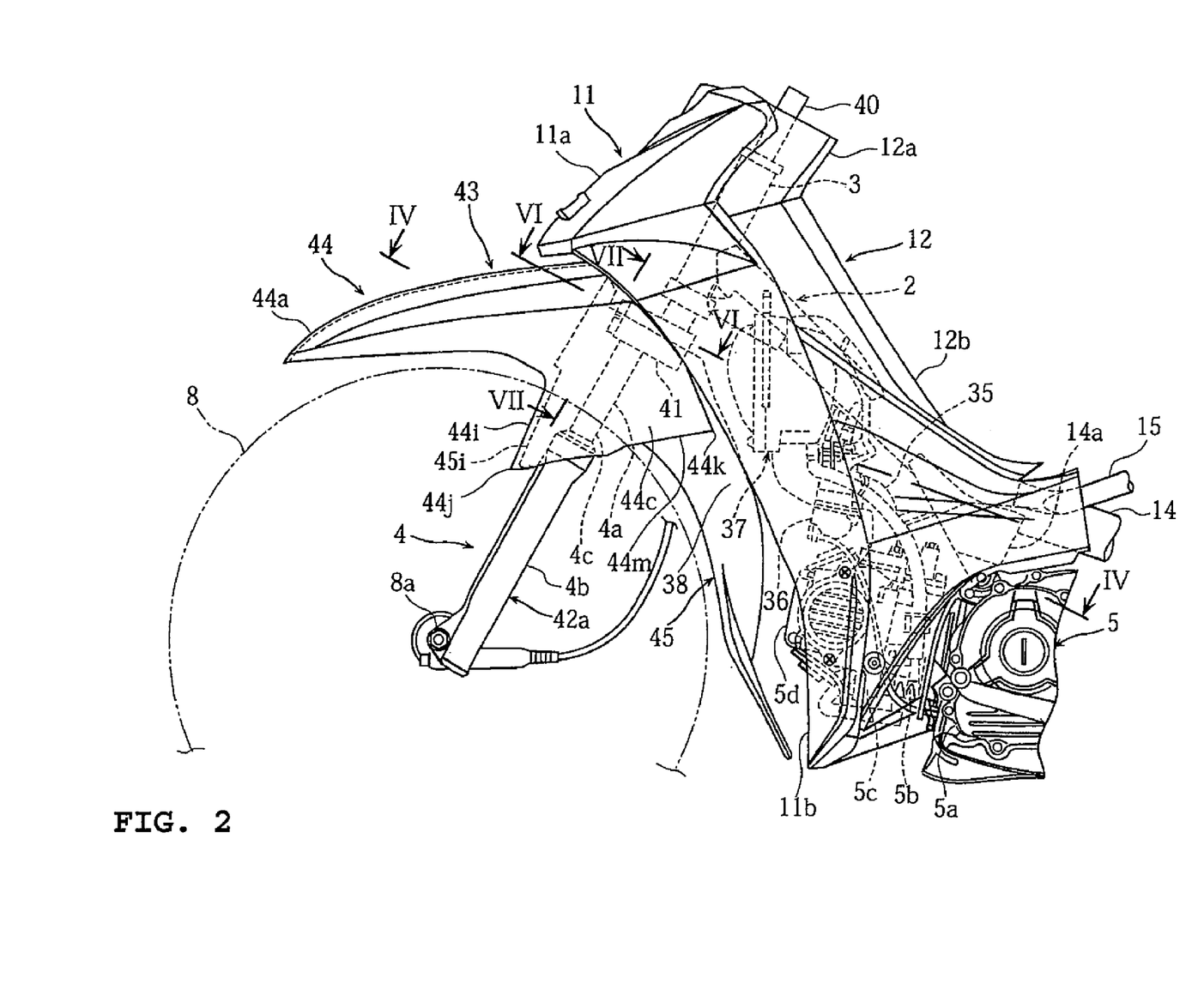
FIG. 2 is a side view around a front fender of the motorcycle.
Figure 3:
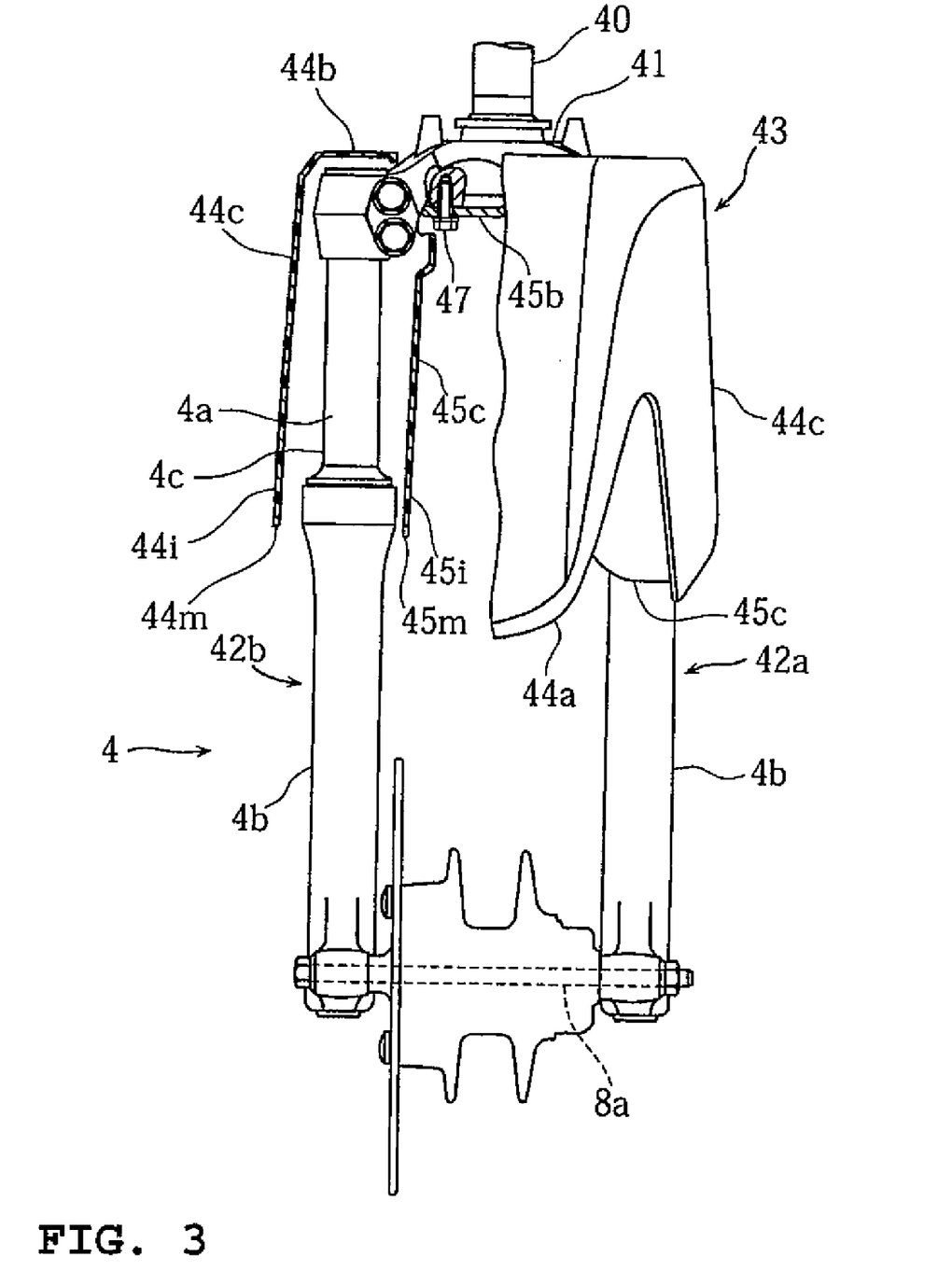
FIG. 3 is a partially sectional front view of the front fender.

The left and right sidewalls 44c and 45c of the front and rear fender halves 44, 45 have extended portions 44i, 45i, respectively, extending downward along the fork bodies 42a, 42b. The extended portions 44i, 45i extend to a position where they cover the upper ends of the outer tubes 4b (FIGS. 2-3). The periphery of a sliding portion 4c of the inner tube 4a is thereby covered throughout the entire stroke thereof.

The front fender half 44 has lower rear end faces 44m extending generally linearly from the lower front ends 44j of the left and right extended portions 44i to the upper rear ends 44k of the left and right sidewalls 44c obliquely upward. In other words, the lower rear end face 44m is formed to extend generally linearly from the upper rear end 44k to the lower front end 44j obliquely forward and downward. The left and right sidewalls 45c of the rear fender half 45 also have lower rear end faces 45m that are formed in the same manner as the lower rear end faces 44m of the front fender half 44.

On the extension lines of the left and right lower rear end faces 44m and 45m, an air introduction opening (not shown) of the air cleaner 37 is positioned. The lower front end 44j of the extended portion 44i is positioned in front of the front fork 4.

In this embodiment, the left and right sidewalls 44c of the front fender half 44 and the left and right sidewalls 45c of the rear fender half 45 enclose the outer periphery of the inner tubes 4a of the front fork 4, preventing attachment to or impingement on the inner tubes 4a of water or the like splashed by the front wheel 8.

In this embodiment, the left and right sidewalls 44c of the front fender half 44 have the extended portions 44i formed to reach the upper ends of the outer tubes 4b of the front fork 4, and the lower rear end faces 44m formed to extend linearly from the lower front ends 44j of the extended portions 44i to the upper rear ends 44k thereof obliquely upward. The rear fender half 45 also has the similar extended portions 45i. It is thus possible to cover the inner tubes 4a with the extended portions 44i, 45i throughout the entire stroke thereof, preventing attachment to or impingement on the inner tubes 4a of splashed water or the like further reliably. Further, the lower rear end faces 44m of the front fender half 44 are slanting sharply obliquely upward, providing a new design.

In other words, the lower rear end face 44m of the front fender half 44 is inclined forward and downward from the upper rear end 44k. The rainwater that was attached to the front fender half 44 runs down along the lower rear end faces 44m from the left and right sidewalls 44c onto the front side of the front fork 4, thereby restraining rainwater from dripping onto the engine unit 5 or the like.

In this embodiment, the left and right sidewalls 44c of the front fender half 44 have the outwardly protruded parts 44c' formed to surround the outside of the inner tubes 4, and the left and right sidewalls 45c of the rear fender half 45 have the inwardly protruded parts 45c' formed to surround the inside of the inner tubes 4a. It is thus possible to cover the outer periphery of the inner tubes 4a throughout the entire stroke thereof, preventing attachment to the inner tubes 4a of water or the like splashed by the front wheel 8 further reliably.

In this embodiment, the engine unit 5 is suspended from and supported by the main frame 14 of the underbone type body frame 2, and the air cleaner 37 above the engine unit 5 is disposed on the extension lines of the left and right lower rear end faces 44m of the front fender half 44. The lower rear end faces 44m thus serve as guides for guiding a traveling wind into the air cleaner 37.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
 a body frame;
 a front fork pivotally supported by a head pipe of the body frame;
 a front wheel rotatably supported at lower ends of left and right fork bodies of the front fork; and
 a front fender disposed to cover an upper side of the front wheel; wherein
 the front fender is separated into a front fender half and a rear fender half, the front fender half including left and right rear end portions and the rear fender half including left and right front end portions, the left rear end portion and the left front end portion enclosing a circumferential periphery of the left fork body, and the right rear end portion and the right front end portion enclosing a circumferential periphery of the right fork body;
 the rear end portions include extended portions extending downward along the left and right fork bodies, and lower rear end surfaces arranged to extend substantially linearly and obliquely upward from lower front ends to upper rear ends of the extended portions; and
 the front fender half and the rear fender half are not directly fastened to the left and right fork bodies.

2. The motorcycle according to claim 1, wherein the rear end portions of the front fender half protrude outward in a transverse direction of the motorcycle to surround an outside of at least sliding portions of the fork bodies, and the front end portions of the rear fender half protrude inward in the transverse direction to surround an inside of the at least sliding portions of the fork bodies.

3. The motorcycle according to claim 1, wherein the body frame includes a main frame extending from the head pipe obliquely downward and rearward, an engine unit is suspended from and supported by the main frame, and an air cleaner is disposed above the engine unit to be positioned on extension lines of the lower rear end surfaces of the front fender half.

4. The motorcycle according to claim 3, wherein a front cover is disposed on a front side of the head pipe, and a leg shield is disposed on a rear side of the head pipe to cover a rear side of the rear fender half, the leg shield defining an opening for introduction of a traveling wind into the air cleaner.

5. The motorcycle according to claim 1, wherein an upper wall of the front fender half surrounds a front side of a steering shaft, and an upper wall of the rear fender half surrounds a rear side of the steering shaft.

6. The motorcycle according to claim 1, wherein the extended portions reach upper ends of outer tubes of the front fork.

7. The motorcycle according to claim 1, wherein the extended portions also extend forward.

8. A motorcycle comprising:
 a body frame;
 a front fork pivotally supported by a head pipe of the body frame;
 a front wheel rotatably supported at lower ends of left and right fork bodies of the front fork; and
 a front fender disposed to cover an upper side of the front wheel; wherein
 the front fender is separated into a front fender half and a rear fender half, the front fender half including left and right rear end portions and the rear fender half including left and right front end portions, the left rear end portion and the left front end portion enclosing a circumferential periphery of the left fork body, and the right rear end portion and the right front end portion enclosing a circumferential periphery of the right fork body;
 the rear end portions include extended portions extending downward along the fork bodies, and lower rear end surfaces arranged to extend substantially linearly and obliquely downward from upper rear ends to lower front ends of the extended portions; and
 the front fender half and the rear fender half are not directly fastened to the left and right fork bodies.

9. The motorcycle according to claim 8, wherein the rear end portions of the front fender half protrude outward in a transverse direction of the motorcycle to surround an outside of at least sliding portions of the fork bodies, and the front end portions of the rear fender half protrude inward in the transverse direction to surround an inside of the at least sliding portions of the fork bodies.

10. The motorcycle according to claim 8, wherein the body frame includes a main frame extending from the head pipe obliquely downward and rearward, an engine unit is suspended from and supported by the main frame, and an air cleaner is disposed above the engine unit to be positioned on extension lines of the lower rear end surfaces of the front fender half.

11. The motorcycle according to claim 10, wherein a front cover is disposed on a front side of the head pipe, and a leg shield is disposed on a rear side of the head pipe to cover a rear side of the rear fender half, the leg shield defining an opening for introduction of a traveling wind into the air cleaner.

12. The motorcycle according to claim 8, wherein an upper wall of the front fender half surrounds a front side of a steering shaft, and an upper wall of the rear fender half surrounds a rear side of the steering shaft.

13. The motorcycle according to claim 8, wherein the extended portions reach upper ends of outer tubes of the front fork.

14. The motorcycle according to claim 8, wherein the extended portions also extend forward.

15. A motorcycle comprising:
 a body frame;
 a front fork pivotally supported by a head pipe of the body frame;
 a front wheel rotatably supported at lower ends of left and right fork bodies of the front fork; and
 a front fender disposed to cover an upper side of the front wheel; wherein
 the front fender is separated into a front fender half and a rear fender half, the front fender half including rear end portions and the rear fender half including front end portions, the rear end portions and the front end portions enclosing an outer periphery of the left and right fork bodies;
 the rear end portions include extended portions extending downward along the left and right fork bodies, and lower rear end surfaces arranged to extend substantially linearly and obliquely upward from lower front ends to upper rear ends of the extended portions;
 an upper wall of the front fender half surrounds a front side of a steering shaft, and an upper wall of the rear fender half surrounds a rear side of the steering shaft;
 the front fender half further comprises a positioning projection located in a transverse central portion of the upper wall, and sidewalls including engaging lugs bent inward and projecting downward; and
 the rear fender half further comprises a hole facing the positioning projection of the front fender half, and sidewalls including steps with engaged holes facing the engaging lugs of the front fender half.

16. The motorcycle according to claim 15, wherein the upper wall of the front fender half includes recesses that contact the upper wall of the rear fender half, and wherein screws are inserted through the recesses to join the upper walls of the front and rear fender halves.

17. The motorcycle according to claim 15, wherein the sidewalls of the rear fender half include a recess arranged to define the shape of a continuous surface with the sidewalls of the front fender half.

18. A motorcycle comprising:
 a body frame;
 a front fork pivotally supported by a head pipe of the body frame;
 a front wheel rotatably supported at lower ends of left and right fork bodies of the front fork; and
 a front fender disposed to cover an upper side of the front wheel; wherein
 the front fender is separated into a front fender half and a rear fender half, the front fender half including rear end portions and the rear fender half including front end portions, the rear end portions and the front end portions enclosing an outer periphery of the left and right fork bodies;
 the rear end portions include extended portions extending downward along the fork bodies, and lower rear end surfaces arranged to extend substantially linearly and obliquely downward from upper rear ends to lower front ends of the extended portions;
 an upper wall of the front fender half surrounds a front side of a steering shaft, and an upper wall of the rear fender half surrounds a rear side of the steering shaft;
 the front fender half further comprises a positioning projection located in a transverse central portion of the upper wall; and sidewalls including engaging lugs bent inward and projecting downward; and
 the rear fender half further comprises a hole facing the positioning projection of the front fender half; and sidewalls including steps with engaged holes facing the engaging lugs of the front fender half.

19. The motorcycle according to claim 18, wherein the upper wall of the front fender half includes recesses that contact the upper wall of the rear fender half and wherein screws are inserted through the recesses to join the upper walls of the front and rear fender halves.

20. The motorcycle according to claim 18, wherein the sidewalls of the rear fender half include a recess arranged to define the shape of a continuous surface with the sidewalls of the front fender half.

* * * * *